United States Patent
Agarwal et al.

(10) Patent No.: US 10,887,765 B2
(45) Date of Patent: Jan. 5, 2021

(54) RELAY PROTECTION USING AUTHENTICATION PACKETS IN BLUETOOTH COMMUNICATIONS

(71) Applicant: QUALCOMM Incorporated, San Diego, CA (US)

(72) Inventors: Vishal Agarwal, Ramnagar (IN); Giriraj Goyal, Bangalore (IN)

(73) Assignee: QUALCOMM Incorporated, San Diego, CA (US)

(*) Notice: Subject to any disclaimer, the term of this patent is extended or adjusted under 35 U.S.C. 154(b) by 289 days.

(21) Appl. No.: 16/048,613

(22) Filed: Jul. 30, 2018

(65) Prior Publication Data
US 2020/0037157 A1     Jan. 30, 2020

(51) Int. Cl.
| | |
|---|---|
| H04L 29/06 | (2006.01) |
| H04W 12/06 | (2009.01) |
| H04W 4/80 | (2018.01) |
| H04L 9/32 | (2006.01) |
| H04W 12/10 | (2009.01) |

(52) U.S. Cl.
CPC ........... *H04W 12/06* (2013.01); *H04L 9/3226* (2013.01); *H04W 4/80* (2018.02); *H04W 12/10* (2013.01); *H04L 2209/805* (2013.01)

(58) Field of Classification Search
CPC ....... H04W 12/06; H04W 12/10; H04W 4/80; H04L 2209/805; H04L 63/08
See application file for complete search history.

(56) References Cited

U.S. PATENT DOCUMENTS

| | | | | |
|---|---|---|---|---|
| 7,545,941 | B2* | 6/2009 | Sovio | H04L 63/0492 380/270 |
| 8,484,466 | B2* | 7/2013 | Marin | H04L 9/0841 713/168 |
| 8,538,334 | B2* | 9/2013 | Inagaki | H04L 45/02 455/41.2 |
| 8,542,833 | B2* | 9/2013 | Devol | G06F 21/305 380/259 |
| 8,966,255 | B2* | 2/2015 | Koyama | G08C 17/02 713/168 |
| 10,148,453 | B2* | 12/2018 | Batra | H04W 4/80 |
| 2015/0082427 | A1 | 3/2015 | Ivanchykhin et al. | |
| 2016/0100311 | A1 | 4/2016 | Kumar | |

OTHER PUBLICATIONS

International Search Report and Written Opinion—PCT/US2019/041323—ISA/EPO—dated Sep. 18, 2019.
Kugler D., "Man in the Middle—Attacks on Bluetooth", Jan. 27, 2003 (Jan. 27, 2003), pp. 149-161, XP055033794, Retrieved from the Internet: URL: http://www.springerlink.com/content/4tuyngkdmv3ulfib/fulltext.pdf [retrieved on Jul. 25, 2012], Section 5.

* cited by examiner

*Primary Examiner* — Hosuk Song
(74) *Attorney, Agent, or Firm* — Qualcomm Incorporated

(57) ABSTRACT

A method for relay protection using authentication packets in Bluetooth communications is described. The method includes establishing, by a first wireless device, a Bluetooth communication connection to a second wireless device. The method also includes generating, by the first wireless device, an encrypted authentication packet that includes authentication information and a message integrity check (MIC). The method also includes transmitting, by the first wireless device, the encrypted authentication packet to the second wireless device.

20 Claims, 6 Drawing Sheets

RELAY PROTECTION USING AUTHENTICATION PACKETS IN BLUETOOTH COMMUNICATIONS

TECHNICAL FIELD

The present disclosure relates generally to wireless communications, and more particularly, to relay protection using authentication packets in Bluetooth communications.

BACKGROUND

In the last several decades, the use of wireless devices has become common. In particular, advances in electronic technology have reduced the cost of increasingly complex and useful wireless devices. Cost reduction and consumer demand have proliferated the use of wireless devices in our daily lives.

Wireless devices may make use of one or more wireless communication technologies. For example, a wireless device may communicate using Bluetooth technology. The use of Bluetooth technology in wireless devices has become much more common in the last several years and is regularly used in retail businesses, offices, homes, cars, and public gathering places.

As the use of Bluetooth communications has grown, so has the need of securing Bluetooth communications between wireless devices from third party attacks. For example, Bluetooth communications between wireless devices are susceptible to certain third party attacks such as the relay in the middle (RITM) attack. A RITM attack is an attack that occurs when a third party attacker intercepts packets transmitted between Bluetooth wireless devices and then subsequently relays those packets to one of the wireless devices in order to gain access. One example includes a third party attacker relaying packets from a key fob to an automobile in order to unlock the automobile car door.

A RITM attack can create significant risk to important data and physical property since a successful RITM attacker can gain access in a fairly undetectable manner. The existing solutions to a RITM attack have certain limitations that do not adequately protect users of wireless devices. Accordingly, a need exists for a way to secure Bluetooth communications between wireless devices that will effectively stop a RITM attack.

SUMMARY

In an aspect of the present disclosure, a method for relay protection using authentication packets in Bluetooth communications is described. The method includes establishing, by a first wireless device, a Bluetooth communication connection to a second wireless device. The method also includes generating, by the first wireless device, an encrypted authentication packet that includes authentication information and a message integrity check (MIC). The method also includes transmitting, by the first wireless device, the encrypted authentication packet to the second wireless device.

The method further includes receiving, by the second wireless device, the encrypted authentication packet, wherein the second wireless device decrypts the authentication packet and validates the authentication information and the MIC in the received authentication packet against validation information contained in the second wireless device. In one implementation, the second wireless device validates the authentication information and the MIC against the validation information by calculating a MIC value of the received authentication packet and comparing against a MIC value included in the received authentication packet and comparing a connection event count and a sub event count included in the received authentication packet against a connection event count and a sub event count tracked by the second wireless device. In this implementation, the Bluetooth communications between the first wireless device and second wireless device can be Bluetooth Low Energy. In another implementation, the second wireless device validates the authentication information and the MIC against the validation information by calculating a MIC value of the received authentication packet and comparing against the MIC value included in the received authentication packet and comparing a master clock time included in the received authentication packet against a master clock time tracked by the second wireless device. In this implementation, the Bluetooth communications between the first wireless device and second wireless device can be BR/EDR (Bluetooth Basic Rate/Enhanced Data Rate).

The validating by the second wireless device is performed to ensure that the contents of the authentication packet have not been relayed and/or modified during the transmission. The authentication information can include a connection event count and a sub event count generated by the first wireless device. The authentication information can also include a master clock time generated by the first wireless device. The validation information can include a connection event count, a sub event count, and a MIC generated by the second wireless device based on the received authentication packet. The validation information can also include a master clock time and a MIC value generated by the second wireless device based on the received authentication packet.

In an aspect of the present disclosure, a first wireless device for relay protection using authentication packets in Bluetooth communications is described. The first wireless device includes a processor and a memory communicatively coupled with the processor and storing computer-readable code that, when executed by the processor, causes the first wireless device to perform the following steps including establishing a Bluetooth communication connection to a second wireless device, generating an encrypted authentication packet that includes authentication information and a message integrity check (MIC), and transmitting the encrypted authentication packet to the second wireless device.

In another aspect of the present disclosure, a non-transitory tangible computer readable medium is described. The non-transitory tangible computer readable medium includes storing computer executable code for establishing, by a first wireless device, a Bluetooth communication connection to a second wireless device. The non-transitory tangible computer readable medium also includes code for generating, by the first wireless device, an encrypted authentication packet that includes authentication information and a message integrity check (MIC). The non-transitory tangible computer readable medium also includes code for transmitting, by the first wireless device, the encrypted authentication packet to the second wireless device.

In another aspect of the present disclosure, a first wireless device for relay protection using authentication packets in Bluetooth communications is described. The first wireless device includes means for establishing a Bluetooth communication connection to a second wireless device. The first wireless device also includes means for generating, by the first wireless device, an encrypted authentication packet that includes authentication information and a message integrity check (MIC). The first wireless device also includes means for transmitting, by the first wireless device, the encrypted authentication packet to the second wireless device.

DETAILED DESCRIPTION

Figure 1:
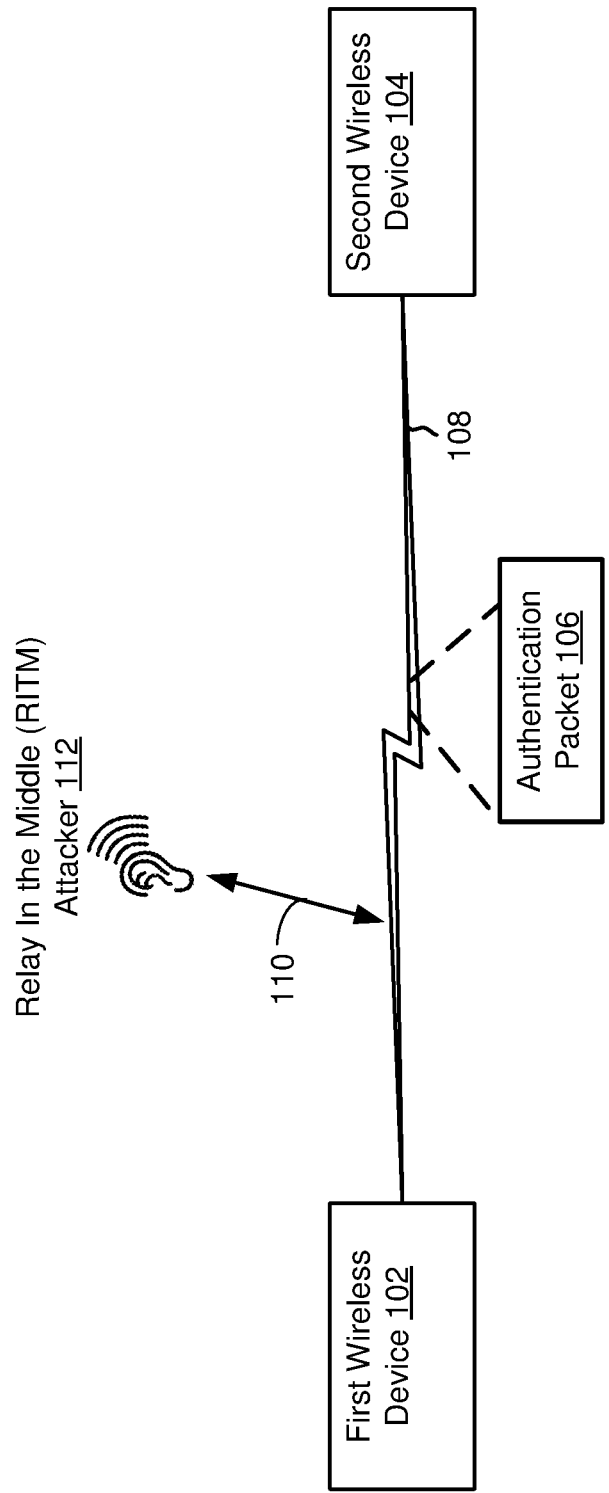
FIG. 1 is a block diagram illustrating one configuration of a first wireless device and a second wireless device implementing relay protection using authentication packets when communicating via Bluetooth communications.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

The proliferation of wireless devices has accelerated the advancement of short range wireless communication technologies such as Bluetooth communications. Bluetooth has developed into a globally used short range wireless communication that is used in many aspects of wireless device communications. With the widespread use of Bluetooth communications, the risk of third party attackers attempting to intercept communications between wireless devices has grown.

One of these kinds of attacks is called a relay in the middle (RITM) attack also known as a relay attack. A RITM attack involves a third party attacker intercepting packets transmitted between Bluetooth wireless devices. The third party attacker then initiates communication with one of the wireless devices by pretending to be the other wireless device. The third party attacker does this by relaying the previous intercepted packets (with or without modification) and attempts to gain access to the other wireless device. RITM attacks are generally focused on compromising assumptions of proximity in order to gain access and are fairly undetectable.

In one example, a RITM attacker can gain access to an automobile with a keyless entry system. Automobiles with keyless entry systems are generally programmed to unlock the door when the automobile wireless key is within a certain distance of the door. An RITM attacker with a relay device can extend the range to something much greater and enable gaining access to a vehicle without being in possession of the key. For example, an RITM attacker can perform a RITM attack while the automobile is in the driveway and the wireless key is in the owner's home.

RITM attackers capitalize on the ineffective protections that currently exist when wireless devices are communicating via Bluetooth communications. In order to relay packets, the RITM attacker has to first collect the packets and then transmit the packets. This brings in additional delay between the transmission of the packets at one wireless device and reception of the packet by the other wireless device. However, current communication protocols work with this delay because the receiving wireless device does not know the transmission time of the packet and thus it cannot figure out if the packet has been relayed or not.

One way to combat against an RITM attack is to eliminate the ability of the RITM attacker to effectively relay the packets to a wireless device and gain access with the use of relay protection. Relay protection can be implemented by using authentication packets that will block access to the receiving wireless device based on built in packet authentication information, other information, encryption, and a resulting validation procedure in the receiving wireless device. In one scenario, the RITM attacker attempts to gain access to an automobile in a driveway by relaying previous intercepted authentication packets. When the automobile receives the relayed authentication packets, the automobile performs a validation process on the authentication packets. The automobile will reject the authentication packets when the validation process fails and the automobile determines that the authentication packets have been relayed.

FIG. 1 is a block diagram illustrating one configuration of a first wireless device 102 and a second wireless device 104 implementing relay protection using authentication packets 106 when communicating via Bluetooth communications.

Some wireless devices may utilize multiple communication technologies. For example, one communication technology may be utilized for mobile wireless system (MWS) (e.g., cellular) communications, while another communication technology may be utilized for wireless connectivity (WCN) communications. MWS may refer to larger wireless networks (e.g., wireless wide area networks (WWANs), cellular phone networks, Long Term Evolution (LTE) networks, Global System for Mobile Communications (GSM) networks, code division multiple access (CDMA) networks, CDMA2000 networks, wideband CDMA (W-CDMA) networks, Universal mobile Telecommunications System (UMTS) networks, Worldwide Interoperability for Microwave Access (WiMAX) networks, etc.). WCN may refer to relatively smaller wireless networks (e.g., wireless local area networks (WLANs), wireless personal area networks (WPANs), IEEE 802.15.4, IEEE 802.11 (Wi-Fi) networks, Bluetooth (BT) networks, Bluetooth SIG specifications and profiles, wireless Universal Serial Bus (USB) networks, etc.).

Communications in a wireless communication system (e.g., a multiple-access system) may be achieved through transmissions over a wireless link. Such a wireless link may be established via a single-input and single-output (SISO), multiple-input and single-output (MISO) or a multiple-input and multiple-output (MIMO) system. A MIMO system includes transmitter(s) and receiver(s) equipped, respectively, with multiple ($N_T$) transmit antennas and multiple ($N_R$) receiver antennas for data transmission. SISO and MISO systems are particular instances of a MIMO system. The MIMO system can provide improved performance (e.g., higher throughput, greater capacity or improved reliability) if the additional functionality created by the multiple transmit and receiver antennas are utilized.

Figure 2:
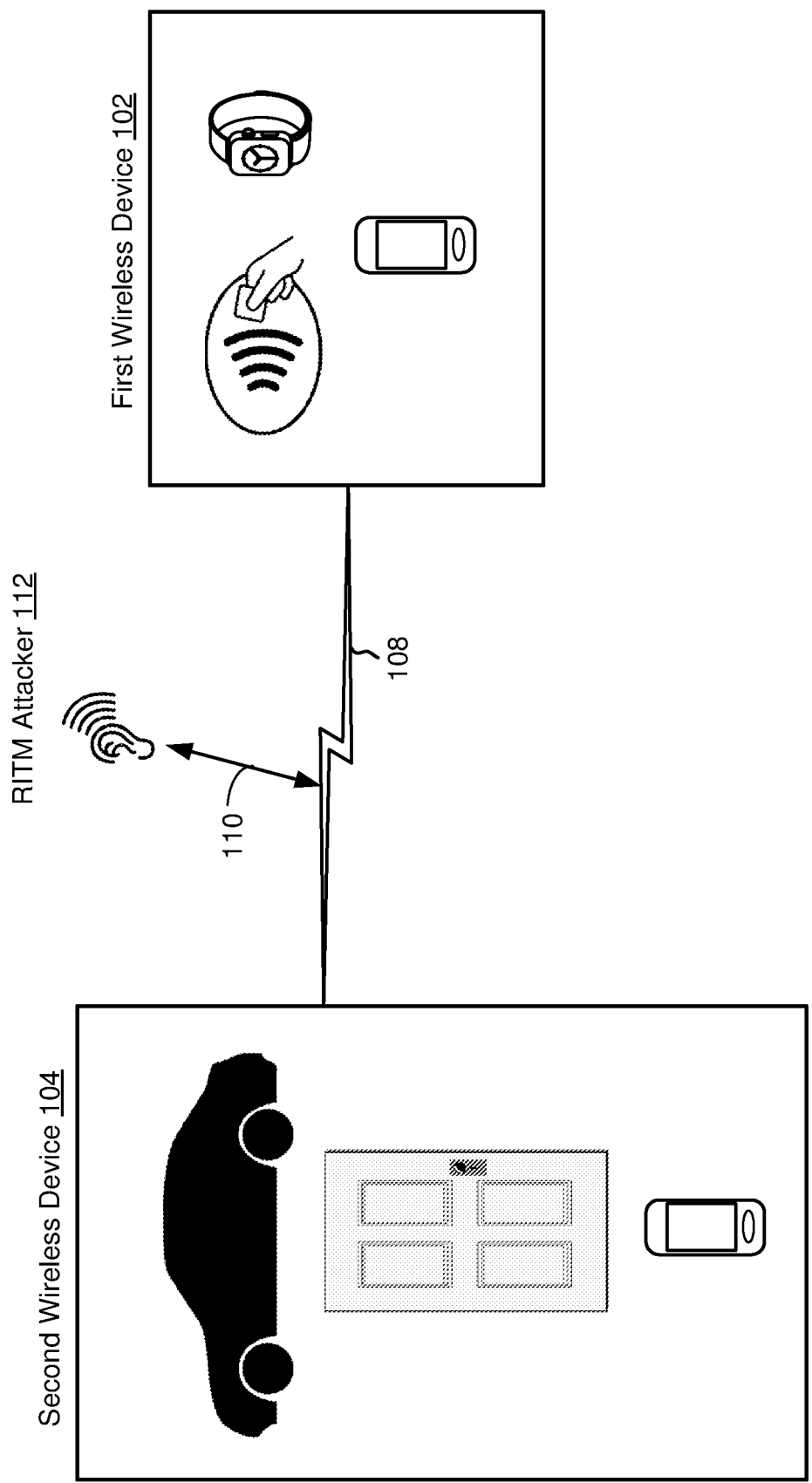
FIG. 2 is a block diagram illustrating examples of a first wireless device and a second wireless device implementing relay protection using authentication packets when communicating via Bluetooth communications.

The first wireless device 102 and second wireless device 104 may also be separately referred to as a wireless device, a mobile device, mobile station, subscriber station, client, client station, user equipment (UE), remote station, access terminal, mobile terminal, terminal, user terminal, subscriber unit, etc. Examples of first wireless device 102 and second wireless device 104 include a laptop or desktop computer, cellular phone, smartphone, wireless modem, e-reader, tablet device, gaming system, keyboard, keypad, computer mice, remote controller, headset, headphone, automobile hands-free audio system, automobile, drone, unmanned aerial vehicle (UAV), wireless key, key fob, door lock, deadbolt, and related devices as also shown in FIG. 2. The first wireless device 102 and second wireless device 104 can be configured to communicate with any of the wireless communication systems discussed above to transmit signals and/or packets.

In an implementation, the first wireless device 102 and second wireless device 104 may be configured to communicate using any type of Bluetooth communication protocols. The first wireless device 102 and second wireless device 104 configured to communicate using Bluetooth communications can establish links with one or more wireless devices that have Bluetooth transceivers. Bluetooth is a packet-based protocol with a master-slave structure. Bluetooth operates in the Industrial, Scientific and Medical (ISM) 2.4 GHz short-range radio frequency band (e.g., 2400-2483.5 MHz). Bluetooth uses a radio technology called frequency-hopping spread spectrum in which transmitted data is divided into packets and each packet is transmitted on a designated Bluetooth frequency (e.g., channel).

Communications in a Bluetooth network may be achieved based on a master polled system. The master polled system may utilize time-division duplexing (TDD) in which the first wireless device 102 may send a packet to the second wireless device 104. For example, the first wireless device 102 may send a packet to the second wireless device 104 during pairing or during a connection request. In one implementation, the first wireless device 102 may be a master wireless device and the second wireless device 104 may be a slave wireless device. In a master polled system, the first wireless device 102 sending the packet gives the second wireless device 104 the ability to transmit back. The roles of the first wireless device 102 and second wireless device 104 may be switched where the first wireless device 102 becomes the slave wireless device and the second wireless device 104 becomes the master wireless device.

In a Bluetooth Low Energy (BLE) implementation, the master wireless device and slave wireless device try to communicate with each other at fixed intervals. At every interval, a connection event count is incremented by 1. In one connection event, the master wireless device and slave wireless device can send one or more data packets. These are called sub events within a connection event. By adding the connection event count and sub event count into a data packet, any data packet sent during the connection event can be uniquely identified. This means that specific data packets can be tracked and identified.

The Bluetooth wireless communication standard is typically employed for exchanging communications between fixed or mobile Bluetooth-enabled devices over short distances. The Bluetooth communication standard is overseen by the Bluetooth SIG which has developed numerous Bluetooth standards and profiles. In some configurations, the systems and methods disclosed herein may be applied to Bluetooth BR/EDR (Basic Rate/Enhanced Data Rate), Bluetooth Low Energy (BLE, also referred to as "Bluetooth Smart"), and other Bluetooth communication standards and protocols.

The following description uses terminology associated with the Bluetooth, Bluetooth BR/EDR, and Bluetooth LE standards. Nevertheless, the concepts may be applicable to other technologies and standards that involve modulating and transmitting digital data. Accordingly, while some of the description is provided in terms of Bluetooth standards, the systems and methods disclosed herein may be implemented more generally in wireless communication devices that may not conform to Bluetooth standards.

As previously discussed, current Bluetooth communications between wireless devices are susceptible to RITM attacks that can result in the RITM attacker 112 gaining access to a device, computer, data, interface, and/or physical property. One effective way to combat against an RITM attack is by implementing relay protection with the use of authentication packets 106. RITM attacks generally occur in two types of situations with the first being where a single RITM attacker is communicating between two wireless devices and the second being where there are multiple RITM attackers each communicating separately with the wireless devices. These two example situations are detailed further below to provide a better understanding how of implementing relay protection with the use of authentication packets is very effective against RITM attacks.

In one example, an RITM attacker 112 makes a communication connection with the first wireless device 102 and the second wireless device 104. The RITM attacker 112 will then separately communicate with the first wireless device 102 pretending to be the second wireless device 104. The RITM attacker 112 will then relay the packets it receives from the first wireless device 102 to the second wireless device 104. The RITM attacker 112 will receive communications back from the second wireless device 104 as the RITM attacker 112 pretends to be the first wireless device 102. The RITM attacker 112 can then gain access to the device, interface, data, and/or property the second wireless device 104 is protecting with control access such as a wireless deadbolt, wireless car door lock, etc.

In another example, the first wireless device 102 and second wireless device 104 are out of range to be able to communicate with each other. In this case, multiple RITM attackers 112 work together to gain access to the device, interface, data, and/or physical property the second wireless device 104 is protecting with control access. The first RITM attacker 112 makes a communication connection with the first wireless device 102 pretending to be the second wireless device 104. A second RITM attacker 112 makes a communication connection with the second wireless device 104 pretending to be the first wireless device 102. The first RITM attacker 112 will then relay packets it receives from the first wireless device 102 to the second RITM attacker 112. The second RITM attacker 112 will then relay the relayed packets to the second wireless device 104 in an attempt to gain access. The second RITM attacker 112 will then receive communications back from the second wireless device 104 and then be able to gain access to the device, interface, data, and/or property the second wireless device 104 is protecting with control access such as a security badge, etc.

The two example situations show how RITM attackers 112 can comprise communications between wireless devices. The implementation below illustrates how relay protection with the use of authentication packets can be very effective against RITM attacks.

In an implementation using authentication packets 106, the first wireless device 102 establishes a Bluetooth communication connection 108 to the second wireless device 104. The first wireless device 102 generates an encrypted authentication packet 106 that includes authentication information and a message integrity check (MIC). The first wireless device 102 transmits the encrypted authentication packet 106 to the second wireless device 104. The second wireless device 104 receives the encrypted authentication packet 106 and then performs a validation on the encrypted authentication packet 106. As part of the validation, the second wireless device 104 can use the authentication information and MIC included in the authentication packet 106 along with other information to make the determination if the authentication packet 106 was relayed. The validation process is discussed in more detail in the FIG. 3 discussion.

When the authentication packet 106 is implemented as discussed above, the RITM attacker 112 will be unable to relay an authentication packet 106 and gain access. For example, the RITM attacker 112 will establish a communication connection 110 with the first wireless device 102 and second wireless device 104 and subsequently relays an authentication packet 106 from the first wireless device 102 to the second wireless device 104. The RITM attacker 112 can transmit other types of intercepted packets for establishing the communication connection 110 to the first wireless device 102 and second wireless device 104.

The second wireless device 104 will receive the relayed encrypted authentication packet 106 and then perform a validation on the relayed encrypted authentication packet 106 to determine if the authentication packet 106 was relayed by the RTIM attacker 112. As part of the validation, the second wireless device 104 can use the authentication information and MIC included in the authentication packet 106 along with other information to make the determination if the authentication packet 106 was relayed. The validation process is discussed in more detail in the FIG. 3 discussion.

A RITM attack can be effectively thwarted and easily detected with the use of an authentication packet 106 since the act of relaying the authentication packet 106 will change the validation information 318 that is determined by the second wireless device 104 during the validation process. The second wireless device 104 will detect during the validation process that the authentication information 306 and validation information 318 do not match and will reject the packet.

In one implementation, the authentication packet 106 is a single use or one-time use packet where the authentication packet 106 is valid for only one transmission. For example, when an authentication packet 106 is retransmitted, the authentication information 306 can change for the authentication packet 106. For example, if an RITM attacker tries to relay the authentication packet 106, then the authentication packet 106 will not be valid when it is delivered to the second wireless device 104.

The first wireless device 102 and second wireless device 104 can both generate one or more authentication packets 106 and encrypt and/or decrypt one or more authentication packets 106 depending on the configuration. The authentication packet 106 can be generated by the first wireless device 102 and/or the second wireless device 104 with software, hardware, or a combination of both for any type of Bluetooth communications. The software can be the standard Bluetooth software and/or additional Bluetooth software installed on wireless devices to allow for any type of Bluetooth communications. The first wireless device 102 and second wireless device 104 can generate one or more authentication packets 106 in various timeframes, formats, and structures depending on the type and configuration of the Bluetooth communications. The authentication packet 106 can also include any type of data such as audio, video, text, documents, graphics, and related data.

The communication connection 108 between the first wireless device 102 and second wireless device 104 is made up of signals and/or packets. The communication connection 108 can be implemented with any wired and/or wireless communication technology discussed.

Figure 6:
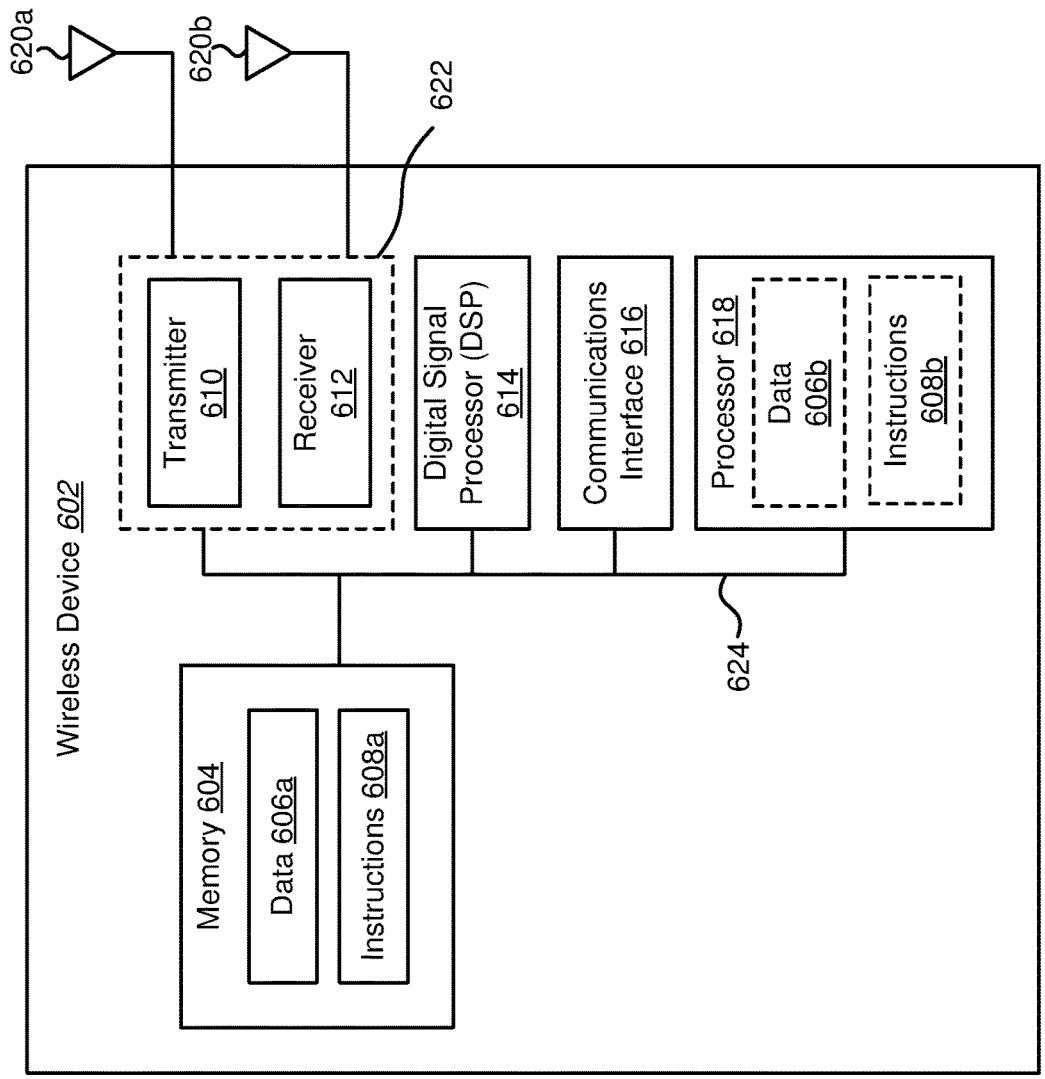
FIG. 6 illustrates certain components that may be included within a wireless device.

The first wireless device 102 and second wireless device 104 will also include additional software and hardware as further detailed in the wireless device in FIG. 6 which may also include one or more transmitters and receivers, processor(s), memory, antennas, digital signal processor(s), communications interface, user interface, operating systems, and related subsystems required to operate and implement the methods described in the first wireless device 102 and second wireless device 104.

The RITM attacker 112 can use wireless devices and specialized hardware and/or software that will allow the RITM attacker 112 to intercept, capture, and store packets transmitted between the first wireless device 102 and second wireless device 104 over communication connection 110. The RITM attacker 112 can also initiate a communication connection 110 and communicate with the first wireless device 102 and/or second wireless device 104.

The described systems and methods can increase the ability of the first wireless device 102 and the second wireless device 104 to combat the ability of an RITM attacker 112 from committing an RITM attack. This provides users with the additional layer of protection knowing that their Bluetooth communications are secure.

Figure 3:
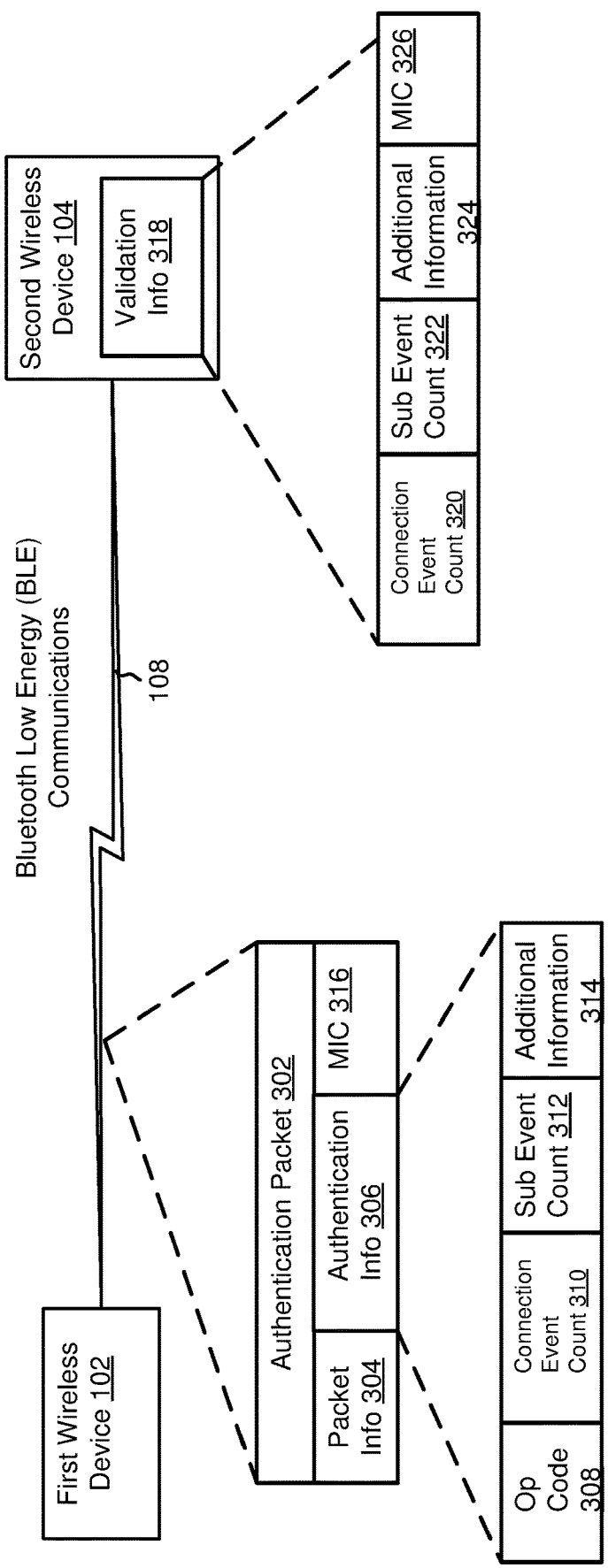
FIG. 3 is a block diagram illustrating one implementation of the structure of an authentication packet that includes authentication information and a MIC that is communicated between the first wireless device and second wireless device via Bluetooth Low Energy (BLE) communication.

FIG. 3 is a block diagram illustrating one implementation of the structure of an authentication packet 106 that includes authentication information 306 and a MIC 316 that is communicated between the first wireless device 102 and second wireless device 104 via Bluetooth Low Energy (BLE) communication.

As discussed in FIG. 1, the authentication packet 106 can be implemented in different configurations and carry various kinds of data depending on the selected Bluetooth communication type. In one implementation, the authentication packet 106 is illustrated in the FIG. 3 implementation as authentication packet 302 using a BLE communication packet structure. Authentication packet 302 includes packet information 304, authentication information 306, and MIC 316.

Packet information 304 includes fields that are required to implement the packet in a Bluetooth communication system. The fields and included information will be different depending on which Bluetooth communication type is selected. For example, a BLE communication will contain different packet information fields than a BR/EDR communication. The packet information 304 can include fields that are required and/or optional to implement Bluetooth communications based on a Bluetooth standard. The packet information 304 can include additional fields that are needed for implementation and/or add additional functionality.

Authentication information 306 can include one or more fields that contain specific information regarding authentication of authentication packet 302. In one implementation, authentication information 306 includes op code 308, connection event count 310, sub event count 312, and additional information 314.

Op code 308 can include information on the specific type of packet and the identity of the wireless device that sent the authentication packet 302. For example, the op code 308 can identity to a receiving wireless device such the second wireless device 104 that the packet is an authentication packet 302 and it was sent from the first wireless device 102.

Connection event count 310 can include information regarding the identity of the authentication packet 302. In one implementation, the first wireless device 102 and second wireless device 104 establish a Bluetooth communication connection and the first wireless device 102 transmits an encrypted authentication packet 302 to the second wireless device 104. The first wireless device 102 controls the connection event count 310 and will increment the connection event count 310 every connection interval. In general, the first wireless device 102 and/or the second wireless device 104 can control the connection event count 310 and increment the connection event count 310 every connection interval. This means that both the first wireless device 102 and the second wireless device 104 know the value of the current connection event count 310 which enables them to do the validation process since they are both in synch on the current connection event count 310.

In one example, an RITM attacker 112 receives the authentication packet 302 from the first wireless device 102 by pretending to be the second wireless device 104. The RITM attacker 112 relays the encrypted authentication packet 302 to the second wireless device 104 which causes the connection event count 310 to change. The second wireless device 104 during the validation process will then detect the change in the connection event count 310 and reject the authentication packet 302.

In another example, an RITM attacker 112 receives the authentication packet 106 from the first wireless device 102 by pretending to be the second wireless device 104. In this case, the RITM attacker 112 stores the authentication packet 302 and then relays it to the second wireless device 104 during the same connection event count 310 which may cause the connection event count to stay the same. This means that the second wireless device 104 will not detect that the authentication packet 302 has been relayed. In this case, the first wireless device 102 and second wireless device 104 can implement dual authentication packets 302 and validation processes to thwart the RITM attacker 112. To implement this case, the first wireless device 102 will transmit an authentication packet 302 to the second wireless device 104 which will then validate the received authentication packet 302. After the second wireless device 104 validates the authentication packet 302, the second wireless device 104 will transmit an authentication packet 302 to the first wireless device 102 which will then validate the authentication packet 302. Once the first wireless device 102 validates the authentication packet 302, the first wireless device 102 will transmit a packet to the second wireless device 104 notifying that the authentication packets 302 were not relayed and can be processed. The first wireless device 102 and second wireless device 104 can both implement transmitting and receiving authentication packets 302, performing the validation process of authentication packets 302, notifying that authentication packets 302 were not relayed, and any other related functions and/or combination of these processes.

Sub event count 312 can include information on the count of how many authentication packets 302 and/or other data packets have been communicated back and forth between the first wireless device 102 and second wireless device 104.

Additional information 314 can include any other necessary information needed to implement authentication of the data packets of a wireless device.

MIC 316 is also known as the message integrity check. The MIC 316 can include specific information that can determine if the contents of the authentication packet 302 has changed. The MIC 316 ensures that the content of the authentication packet 302 has not been tampered with by an attacker. The MIC 316 can be a fixed value, derived value, or a calculated value depending on the particular configuration of the authentication packet 302.

Validation information 318 can include any type of information that is needed for the second wireless device 104 to perform validation of the authentication packet 302. For example, the validation information 318 can include information received from the first wireless device 102, information based on the Bluetooth communication connection 108 type, information based on the received authentication packet 302, information referenced by and/or calculated by the second wireless device 104, and other related information. In one implementation, the validation information 318 includes connection event count 320, sub event count 322, additional information 324, and MIC 326.

The authentication packet 302 is validated by the second wireless device 104 by calculating and comparing information from the authentication packet 302 against validation information 318. The second wireless device 104 stores validation information 318 that allows for the second wireless device 104 to validate the authentication packet 302 sent from the first wireless device 102. The first wireless device 102 can also perform the same validation process as the second wireless device 104 and store validation information.

Connection event count 320 and the sub event count 322 can be sent by the first wireless device 102 to the second wireless device 104 during and/or after they establish a Bluetooth communication connection.

Additional information 324 can include any other necessary information needed to implement validation of the data packets such as the authentication packet 302.

MIC 326 can be used by the second wireless device 104 to validate that the contents of the received authentication packet 302 has not changed. In one implementation, the second wireless device 104 will perform a calculation based on the received authentication packet 302 to derive the MIC 326. The second wireless device 104 can then compare the MIC 316 against the MIC 326 to see if they are the same value. If the values are different, then second wireless device 104 can determine that the authentication packet 302 has been tampered with by a third party. The second wireless device 104 can implement the validation use of the MIC 326 differently based on the implementation.

Figure 4:
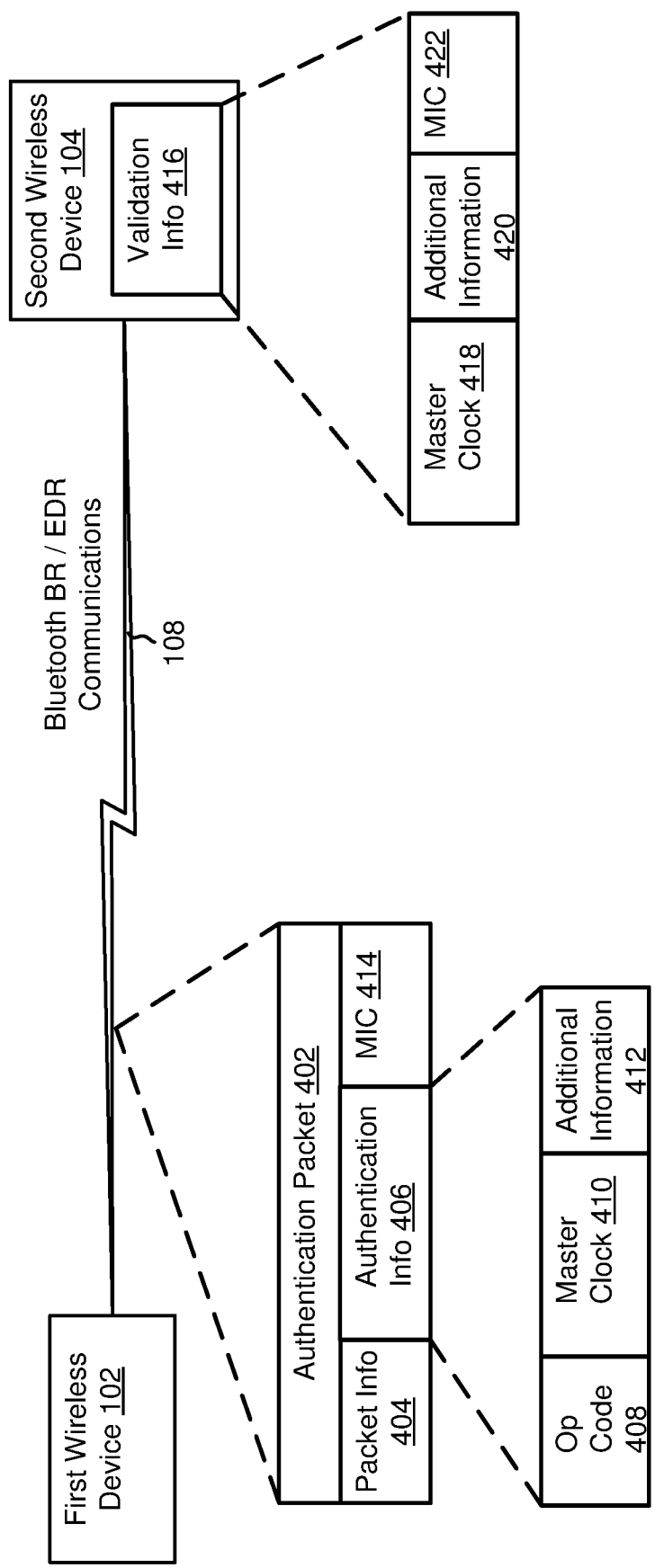
FIG. 4 is a block diagram illustrating one implementation of the structure of an authentication packet that includes authentication information and a MIC that is communicated between the first wireless device and second wireless device via Bluetooth BR/EDR communications.

FIG. 4 is a block diagram illustrating one implementation of the structure of an authentication packet 106 that includes authentication information 406 and a MIC 414 that is communicated between the first wireless device 102 and second wireless device 104 via Bluetooth BR/EDR communications.

As discussed in FIG. 1, the authentication packet 106 can be implemented in different configurations depending on the selected Bluetooth communication type. In one implementation, the authentication packet 106 is illustrated in the example of FIG. 4 as authentication packet 402 using a Bluetooth BR/EDR communication packet structure. Authentication packet 402 includes packet information 404, authentication information 406, and MIC 414.

Packet information 404 includes fields that are required to implement the packet in a Bluetooth communication system. The fields and included information will be different depending on which Bluetooth communication type is selected. For example, a BLE communication will contain different packet information fields than a BR/EDR communication. The packet information 404 can include fields that are required and/or optional to implement Bluetooth communications based on a Bluetooth standard. The packet information 404 can include additional fields that are needed for implementation and/or add additional functionality.

Authentication information 406 can include one or more fields that contain specific information regarding authentication of authentication packet 402. In one implementation, authentication information 406 includes op code 408, master clock 410, and additional information 412.

Op code 408 can include information on the specific type of packet and the identity of the wireless device that sent the authentication packet 402. For example, the op code 408 can identity to a receiving wireless device such the second wireless device 104 that the packet is an authentication packet 402 and it was sent from the first wireless device 102.

Master clock 410 can include information on an internal device, referenced, and/or derived time. In one implementation, the master clock 410 can be the internal reference time of the wireless device that has transmitted and/or received the authentication packet 402. In another implementation, the master clock 410 can be the reference time of the piconet established by two wireless devices establishing a Bluetooth communication connection. For example, the first wireless device 102 and the second wireless device 104 establish a Bluetooth communication connection using BR/EDR and then reference time used by both wireless devices will be based on that established connection. In this implementation, this reference time will be the master clock 410 which enables both wireless device to synchronize on a specific time in order to track and coordinate the sending and receiving of data packets. In another implementation, the master clock 412 can be a time that is derived by the first wireless device 102 and/or second wireless device 104.

Additional information 412 can include any other necessary information needed to implement authentication of the data packets of a wireless device.

As similarly discussed in FIG. 3, the authentication packet 302 is validated by the second wireless device 104 by calculating and comparing information from the authentication packet 106 against validation information 416. The second wireless device 104 stores validation information 416 that allows for the second wireless device 104 to validate the authentication packet 402 sent from the first wireless device 102.

Validation information 416 can include any type of information that is needed for the second wireless device 104 to perform validation of the authentication packet 402. For example, the validation information 416 can include information received from the first wireless device 102, information based on the Bluetooth communication connection 108 type, information based on the received authentication packet 402, information referenced by and/or calculated by the second wireless device 104, and other related information. In one implementation, the validation information 416 includes master clock 418, additional information 420 and MIC 422.

Master clock 418 can include information on an internal device, referenced, and/or derived time. In one implementation, the master clock 418 can be the internal reference time of the second wireless device 104. In another implementation, the master clock 410 can be the reference time of the piconet established by first wireless device 102 and the second wireless device 104. For example, the first wireless device 102 and the second wireless device 104 establish a Bluetooth communication connection using BR/EDR and then reference time used by both wireless devices will be based on that established connection. In this implementation, the master clock 418 will be the same time as the master clock 410 stored in the first wireless device 102. This will be considered the reference time that both wireless devices will use to track and synchronize the sending and receiving of data packets. In another implementation, the master clock 418 can be a time that is derived by the first wireless device 102 and/or second wireless device 104.

Additional information 420 can include any other necessary information needed to implement validation of the data packets such as the authentication packet 402.

MIC 422 can be used by the second wireless device 104 to validate that the contents of the received authentication packet 402 has not changed. In one implementation, the second wireless device 104 will perform a calculation based on the received authentication packet 106 to derive the MIC 422. The second wireless device 104 can then compare the MIC 414 against the MIC 422 to see if they are the same value. If the values are different, then second wireless device 104 can determine that the authentication packet 402 has been tampered with by a third party. The second wireless device 104 can implement the validation use of the MIC 422 differently based on the implementation.

Figure 5:
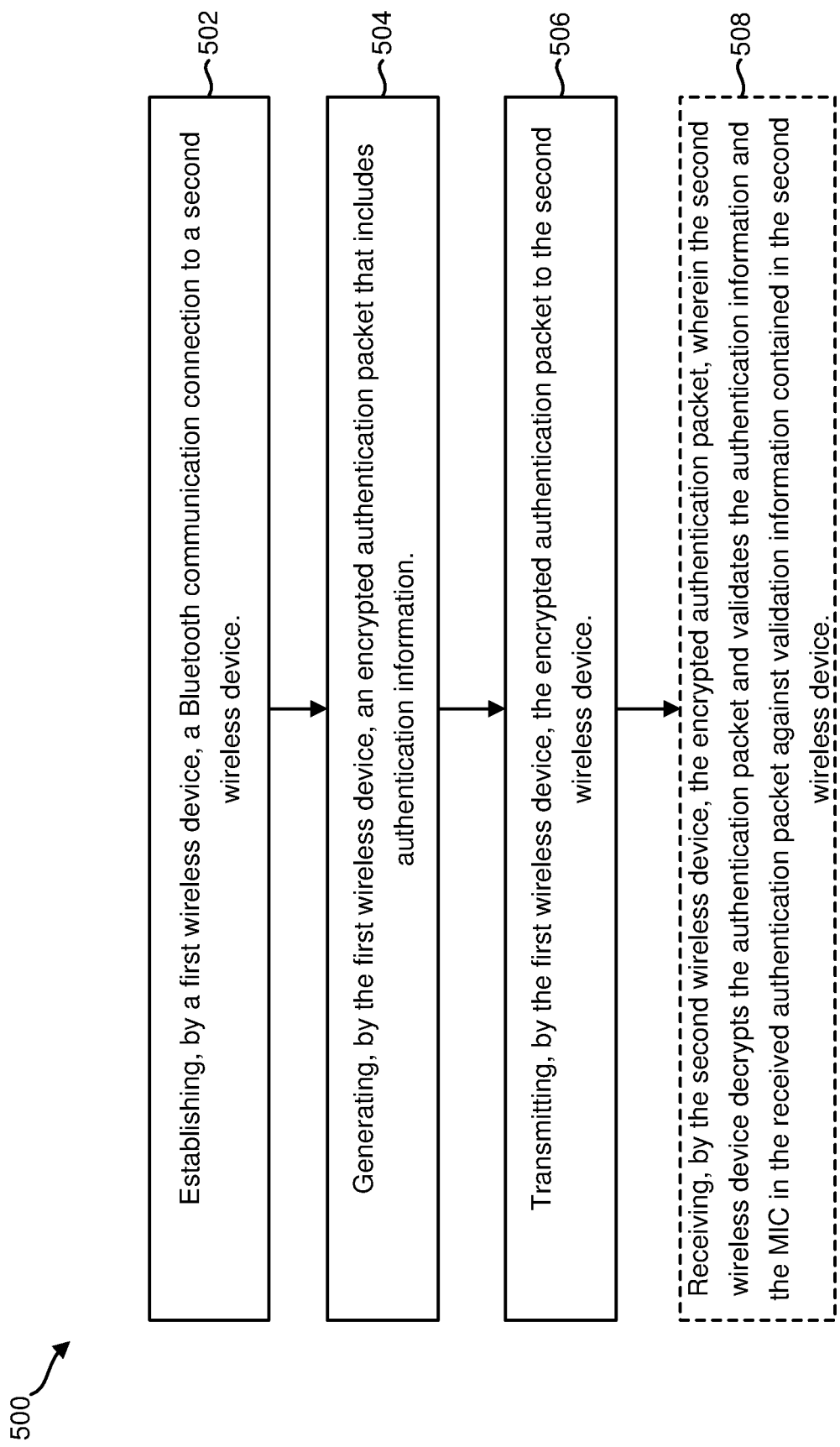
FIG. 5 is a flow diagram illustrating a method for relay protection using authentication packets when communicating via Bluetooth communications.

FIG. 5 is a flow diagram illustrating a method for relay protection using authentication packets when communicating via Bluetooth communications. Referring to FIGS. 3 and 4, this method 500 may be implemented by the first wireless device 102 communicating with the second wireless device 104 over communication connection 108 via Bluetooth communications. For ease of explanation, the flow diagram description below will use the reference numbers of FIG. 3 which will have some equivalent reference number with FIG. 4. The only differences between FIGS. 3 and 4 is in the structure and description of the authentication information 306 and 406 and the validation information 318 and 416 since FIG. 3 applies to a BLE structure and FIG. 4 applies to a BR/EDR structure. In the description of this method 500 below, these differences will be pointed out in reference to each figure separately and a description will be provided.

At step 502, the first wireless device 102 establishes a Bluetooth communication connection 108 to a second wireless device 104. The Bluetooth communication connection can be any Bluetooth communication supported by the Bluetooth SIG (i.e., standards, profiles, protocols), BR/EDR, BLE, and any other related Bluetooth communication type. The first wireless device 102 and second wireless device 104 will establish the Bluetooth communication connection through the Bluetooth pairing process as described in the FIG. 1 description in more detail. The pairing process enables the first wireless device 102 and second wireless device 104 to exchange packets along with other tracking and synchronizing information.

At step 504, the first wireless device 102 generates an encrypted authentication packet 106 that includes authentication information 306 and a message integrity check (MIC) 316.

The first wireless device 102 can generate and encrypt the authentication packet 106 using different encryption techniques. The encryption techniques will differ depending on the Bluetooth communication type being used by the first wireless device 102 and second wireless device 104. For example, a Bluetooth communication connection using BLE will enable the first wireless device 102 and second wireless device 104 to use a shared secret key to provide the encryption. The encryption is generally setup between the first wireless device 102 and second wireless device 104 when the Bluetooth communication connection is being established and before any authentication packets 106 are sent.

The first wireless device 102 can generate the encrypted authentication packet 106 based on the selected Bluetooth communication connection. The structure of the authentication packet 302 will differ based on the Bluetooth communication connection as shown in FIGS. 3 and 4 in reference to authentication packet 302 and 402.

In one implementation, the Bluetooth communication connection between the first wireless device 102 and the second wireless device 104 is Bluetooth Low Energy (BLE). In reference to FIG. 3, the authentication packet 302 includes packet information 304, authentication information 306, and MIC 316. The authentication information 306 includes op code 308, connection event count 310, sub event count 312, and additional information 314.

In another implementation, in reference to FIG. 4, the main difference between a BLE and BR/EDR implementations are the structure difference with the authentication information 306 and 406 fields. Referring to FIG. 4, the authentication packet 402 includes packet information 404, authentication information 406, and MIC 414. The authentication information 406 includes op code 408, master clock value 410, and additional information 412. The descriptions and details of the fields for the authentication packets 302 and 402 can be found in more detail in the FIGS. 3 and 4 descriptions.

At step 506, the first wireless device 102 transmits the encrypted authentication packet 302 to the second wireless device 104.

As shown in FIGS. 3 and 4, the first wireless device 102 and the second wireless device 104 can both transmit and receive one or more encrypted authentication packets 302. The first wireless device 102 and the second wireless device 104 can also both separately and/or in combination make a Bluetooth communication connection with other wireless devices to which they can also transmit and receive one or more encrypted authentication packets 302.

At step 508, referring to FIG. 3, optionally the second wireless device 104 receives the encrypted authentication packet 302. The second wireless device 104 decrypts the authentication packet 302 and validates the authentication information 306 and the MIC 316 in the received authentication packet 302 against validation information 318 contained in the second wireless device 104. The validation information 318 is stored in the second wireless device 104 and includes connection event count 320, sub event count 322, additional information 324, and MIC 326.

In one implementation using BLE as the Bluetooth communications connection, the second wireless device 104 validates the authentication information 306 and the MIC 316 against the validation information 318 by calculating a MIC 326 value of the received authentication packet 302 and comparing against the MIC 316 value included in the received authentication packet 302.

If the MIC values 316 and 326 are different, then second wireless device 104 can determine that the contents of the authentication packet 302 have been modified by a third party. The second wireless device 104 can then reject the authentication packet 302. If the MIC values 316 and 326 are the same, then the second wireless device 104 can validate that the authentication packet 302 has not been changed and then can move onto the next validation step.

Once the second wireless device 104 has determined that the authentication packet 302 has not changed, then the second wireless device 104 will validate the authentication information 306 by comparing the connection event count 310 and the sub event count 312 included in the received authentication packet 302 against the connection event count 320 and the sub event count 322 tracked by the second wireless device 104. If the second wireless device 104 determines that the connection event count 310 and 320 and the sub event count 312 and 322 are the same, then the second wireless device 104 can determine that the authentication packet 302 has not been relayed and accept the authentication packet 302 for processing. If the connection event count 310 and 320 and the sub event count 312 and 322 are different, then the second wireless device 104 can determine that the authentication packet 302 has been relayed and then reject the authentication packet 302.

In another implementation, referring to FIG. 4, the second wireless device 104 receives the encrypted authentication packet 402. The second wireless device 104 decrypts the authentication packet 402 and validates the authentication information 406 and the MIC 414 in the received authentication packet 402 against validation information 416 contained in the second wireless device 104. The validation information 416 is stored in the second wireless device 104 and includes the master clock 418, additional information 420, and MIC 422.

In this implementation using BR/EDR as the Bluetooth communications connection, the second wireless device 104 validates the authentication information 406 and the MIC 414 against the validation information 416 by calculating a MIC 422 value of the received authentication packet 402 and comparing against the MIC value 414 included in the received authentication packet 402.

If the MIC values 414 and 422 are different, then second wireless device 104 can determine that the contents of the authentication packet 402 have been modified by a third party. The second wireless device 104 can then reject the authentication packet 402. If the MIC values 316 and 326 are the same, then the second wireless device 104 can validate that the authentication packet 402 has not been changed and then can move onto the next validation step.

Once the second wireless device 104 has determined that the authentication packet 402 has not changed, then the second wireless device 104 will validate the authentication information 406 by comparing a master clock time 410 included in the received authentication packet 402 against a master clock time 418 tracked by the second wireless device 104. If the second wireless device 104 determines that the master clock times 410 and 418 are the same, then the second wireless device 104 can determine that the authentication packet 402 has not been relayed and accept the authentication packet 402 for processing. If the master clock times 410 and 418 are different, then the second wireless device 104 can determine that the authentication packet 402 has been relayed and then reject the authentication packet 402.

The validation performed by the second wireless device 104 can be implemented with other calculations, data, fields, comparisons, and related validation processes. The validation process performed by the second wireless device 104 can be performed the same way by the first wireless device 102 when it receives encrypted authentication packets 302 from the second wireless device 104.

FIG. 6 illustrates certain components that may be included within a wireless device 602. The wireless device 602 may be a wireless communication device, an access terminal, a mobile station, a user equipment (UE), a laptop computer, a desktop computer, a tablet computer, computer, mobile phone, smartphone, a wireless headset, server, and the like. For example, the wireless device 602 may be implemented in accordance with the first wireless device 102 and second wireless device 104.

The wireless device 602 includes a processor 618. The processor 618 may be a general purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 618 may be referred to as a central processing unit (CPU). Although just a single processor 618 is shown, a combination of processors (e.g., an ARM and DSP) could be used.

The wireless device 602 also includes memory 604 in electronic communication with the processor (i.e., the processor can read information from and/or write information to the memory). The memory 604 may be any electronic component capable of storing electronic information. The memory 604 may be configured as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 606a and instructions 608a may be stored in the memory 604. The instructions may include one or more programs, routines, sub-routines, functions, procedures, code, etc. The instructions may include a single computer-readable statement or many computer-readable statements. The instructions 608a may be executable by the processor 618 to implement the methods disclosed herein. Executing the instructions 608a may involve the use of the data 606a that is stored in the memory 604. When the processor 618 executes the instructions 608a, various portions of the instructions 608b may be loaded onto the processor 618, and various pieces of data 606b may be loaded onto the processor 618.

The wireless device 602 may also include a transmitter 610 and a receiver 612 to allow for transmission and reception of signals to and from the wireless device 602 via one or more antennas 620a-620b. The transmitter 610 and receiver 612 may be collectively referred to as a transceiver 622. The wireless device 602 may also include (not shown) multiple transmitters, multiple receivers, multiple transceivers, communications controllers, and the like that would further enable the wireless device 602 to transmit and receive wireless communications. The types of wireless communications can include but are not limited to Bluetooth, Bluetooth Low Energy (BLE), Bluetooth BD/EDR (Basic Rate/Enhanced Data Rate), WiFi, LTE, CDMA, broadband, NFC and similar wireless communications.

The antennas 620a-620b may include one or more transmitter antennas and one or more receiver antennas. The particular antenna configurations for the wireless device 602 can be based on the number of transmitters and receivers included in the wireless device 602 along with the particular communication network and other factors. In one implementation, there may be multiple transmitter antennas and multiple receiver antennas on a single wireless device.

The wireless device 602 may include a digital signal processor (DSP) 614. The wireless device 602 may also include a communications interface 616. The communications interface 616 may allow a user to interact with the wireless device 602.

The various components of the wireless device 602 may be coupled together by one or more buses, which may include a power bus, a control signal bus, a status signal bus, a data bus, etc. For the sake of clarity, the various buses are illustrated in FIG. 6 as a bus system 624.

In the above description, reference numbers have sometimes been used in connection with various terms. Where a term is used in connection with a reference number, this may be meant to refer to a specific element that is shown in one or more of the Figures. Where a term is used without a reference number, this may be meant to refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a digital signal processor (DSP) and a microprocessor, a plurality of microprocessors, one or more microprocessors in conjunction with a digital signal processor (DSP) core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C.

As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-Ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for relay protection using authentication packets in Bluetooth communications, comprising:
    establishing, by a first wireless device, a Bluetooth communication connection to a second wireless device;
    generating, by the first wireless device, an encrypted authentication packet that includes authentication information and a message integrity check (MIC);
    transmitting, by the first wireless device, the encrypted authentication packet to the second wireless device;
    receiving, by the second wireless device, the encrypted authentication packet, wherein the second wireless device decrypts the authentication packet and validates the authentication information and the MIC in the received authentication packet against validation information contained in the second wireless device; and
    wherein the second wireless device validates the authentication information and the MIC against the validation information by:
    calculating a MIC value of the received authentication packet and comparing against a MIC value included in the received authentication packet; and
    comparing a connection event count and a sub event count included in the received authentication packet against a connection event count and a sub event count tracked by the second wireless device.

2. The method of claim 1, wherein the Bluetooth communications between the first wireless device and second wireless device are Bluetooth Low Energy.

3. The method of claim 1, wherein the second wireless device validates the authentication information and the MIC against the validation information by:
    calculating a MIC value of the received authentication packet and comparing against the MIC value included in the received authentication packet; and
    comparing a master clock time included in the received authentication packet against a master clock time tracked by the second wireless device.

4. The method of claim 3, wherein the Bluetooth communications between the first wireless device and second wireless device are BR/EDR (Bluetooth Basic Rate/Enhanced Data Rate).

5. The method of claim 1, wherein the validating by the second wireless device is performed to ensure that the contents of the authentication packet have not been relayed or modified during the transmission.

6. The method of claim 1, wherein the authentication information includes a connection event count and a sub event count generated by the first wireless device.

7. The method of claim 1, wherein the authentication information includes a master clock time generated by the first wireless device.

8. The method of claim 1, wherein the validation information includes a connection event count, a sub event count, and a MIC generated by the second wireless device based on the received authentication packet.

9. The method of claim 1, wherein the validation information includes a master clock time and a MIC value generated by the second wireless device based on the received authentication packet.

10. A first wireless device for relay protection using authentication packets in Bluetooth communications, comprising:
    a processor; and
    a memory communicatively coupled with the processor and storing computer-readable code that, when executed by the processor, causing the first wireless device to:
    establishing a Bluetooth communication connection to a second wireless device;
    generating an encrypted authentication packet that includes authentication information and a message integrity check (MIC);
    transmitting the encrypted authentication packet to the second wireless device;
    receiving, by the second wireless device, the encrypted authentication packet, wherein the second wireless device decrypts the authentication packet and validates the authentication information and the MIC in the received authentication packet against validation information contained in the second wireless device; and
    wherein the second wireless device validates the authentication information and the MIC against the validation information by:
    calculating a MIC value of the received authentication packet and comparing against a MIC value included in the received authentication packet; and
    comparing a connection event count and a sub event count included in the received authentication packet against a connection event count and a sub event count tracked by the second wireless device.

11. The first wireless device of claim 10, wherein the Bluetooth communications between the first wireless device and second wireless device are Bluetooth Low Energy.

12. The first wireless device of claim 10, wherein the second wireless device validates the authentication information and the MIC against the validation information by:
    calculating a MIC value of the received authentication packet and comparing against the MIC value included in the received authentication packet; and
    comparing a master clock time included in the received authentication packet against a master clock time tracked by the second wireless device.

13. The first wireless device of claim 12, wherein the Bluetooth communications between the first wireless device and second wireless device are BR/EDR (Bluetooth Basic Rate/Enhanced Data Rate).

14. The first wireless device of claim 10, wherein the validating by the second wireless device is performed to ensure that the contents of the authentication packet have not been relayed or modified during the transmission.

15. The first wireless device of claim 10, wherein the authentication information includes a connection event count and a sub event count generated by the first wireless device.

16. The first wireless device of claim 10, wherein the authentication information includes a master clock time generated by the first wireless device.

17. The first wireless device of claim 10, wherein the validation information includes a connection event count, a sub event count, and a MIC generated by the second wireless device based on the received authentication packet.

18. The first wireless device of claim 10, wherein the validation information includes a master clock time and a MIC value generated by the second wireless device based on the received authentication packet.

19. A non-transitory tangible computer readable medium storing computer executable code, comprising:
    code for establishing, by a first wireless device, a Bluetooth communication connection to a second wireless device;
    code for generating, by the first wireless device, an encrypted authentication packet that includes authentication information and a message integrity check (MIC);
    code for transmitting, by the first wireless device, the encrypted authentication packet to the second wireless device;
    code for receiving, by the second wireless device, the encrypted authentication packet, wherein the second wireless device decrypts the authentication packet and validates the authentication information and the MIC in the received authentication packet against validation information contained in the second wireless device; and
    wherein the second wireless device validates the authentication information and the MIC against the validation information by:
    code for calculating a MIC value of the received authentication packet and comparing against a MIC value included in the received authentication packet; and
    comparing a connection event count and a sub event count included in the received authentication packet against a connection event count and a sub event count tracked by the second wireless device.

20. A first wireless device for relay protection using authentication packets in Bluetooth communications, comprising:
    means for establishing, by the first wireless device, a Bluetooth communication connection to a second wireless device;
    means for generating, by the first wireless device, an encrypted authentication packet that includes authentication information and a message integrity check (MIC);
    means for transmitting, by the first wireless device, the encrypted authentication packet to the second wireless device;
    means for receiving, by the second wireless device, the encrypted authentication packet, wherein the second wireless device decrypts the authentication packet and validates the authentication information and the MIC in the received authentication packet against validation information contained in the second wireless device; and
    wherein the second wireless device validates the authentication information and the MIC against the validation information by:
    calculating a MIC value of the received authentication packet and comparing against a MIC value included in the received authentication packet; and
    comparing a connection event count and a sub event count included in the received authentication packet against a connection event count and a sub event count tracked by the second wireless device.

* * * * *